S. H. Smith,
Harvester Rake.
No. 20593. Patented June 15, 1858.
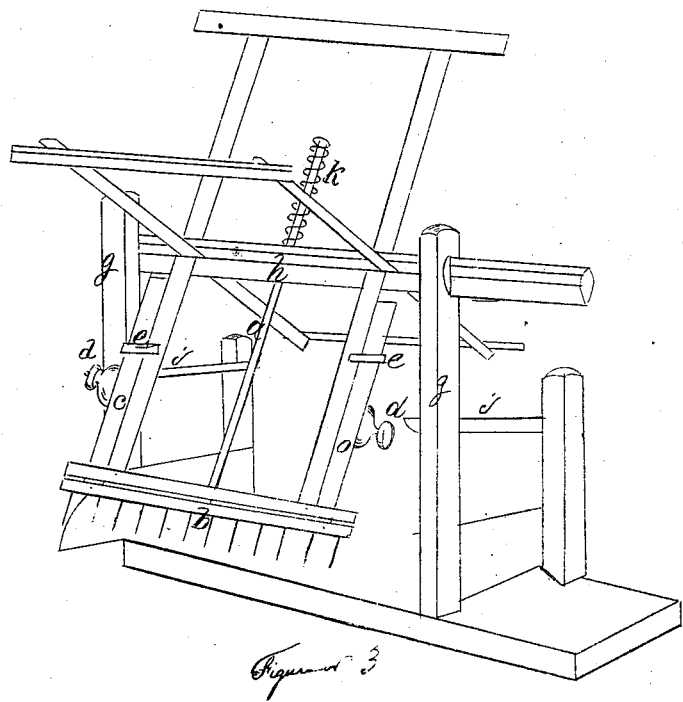
Figure 3.
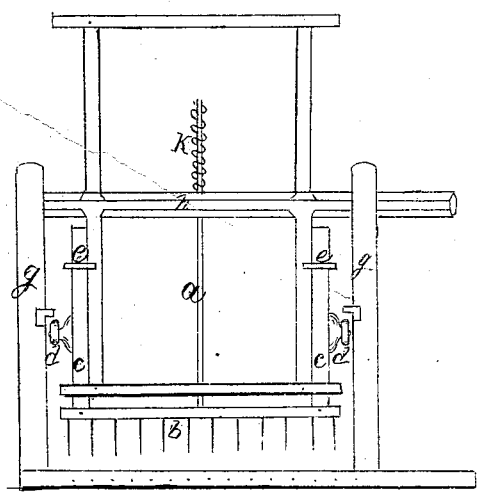
Figure No. 2.
attest
Noah H. Pitts
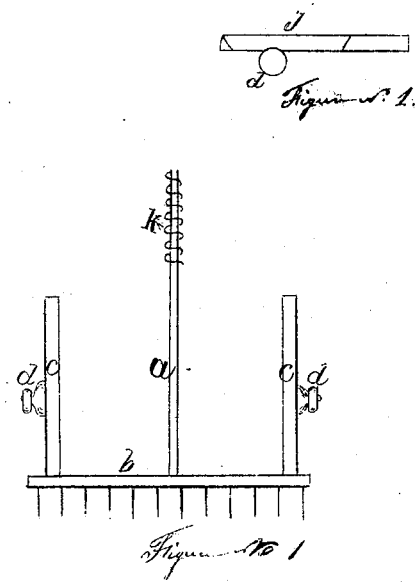
Figure No. 1.
Samuel H. Smith, applicant

UNITED STATES PATENT OFFICE.

S. H. SMITH, OF MAGNOLIA, ILLINOIS.

IMPROVEMENT IN HARVESTERS.

Specification forming part of Letters Patent 20,593, dated June 15, 1858.

*To all whom it may concern:*

Be it known that I, SAMUEL H. SMITH, of Magnolia, in the county of Putnam, State of Illinois, have invented a new and useful Improvement on a Rake for a Grain-Reaper; and I do hereby declare that the following is a full, clear, and exact description of the construction and operation of the same, reference being had to the annexed drawings, making a part of this specification, in which—

Figure 1 is a view of the rake and horizontal plane; Fig. 2, a front view; Fig. 3, a diagonal view of the rake as operating attached to the reaper.

The nature of this invention consists in providing a reaper with a rake attached to the reel, in the manner hereinafter described, for the purpose of removing or raking the grain cut off of the platform. The rake is attached to the reel by means of a slide, $c$, guide $e$, holding the slide to its place, rod $a$, running from the rake $b$ through the beater and through the shaft $h$ of the reel, holding the rake to its place by means of the spiral spring $k$ on the end of the rod $a$.

The raking operation is carried on by two rollers, $d$, one on each side of slides $c$, working at a given time—that is, at each revolution of the reel—on two horizontal planes, $i$, fastened to upright $g$, presses the rake down near the platform, so as to rake back the grain off of the platform. When it passes the length of the planes it is thrown back by means of the spring to its original position.

This improvement is intended to be used on the back-raking reaper. The power is derived from the driving-power of the reaper, constructed by cog-wheels or chain-gearing or belt.

I do not claim any of the parts separately; but

I claim—

The application of the rake to the reel of a reaping-machine by means of the slides $c$, guides $e$, rollers $d$, horizontal planes $i$, and rod spiral spring $k$, when these several parts are constructed and arranged as set forth, for the purposes specified.

SAMUEL H. SMITH.

Witnesses:
 NOAH H. LETTS,
 W. E. FOSTER.